United States Patent

Corrigan et al.

[15] 3,695,121
[45] Oct. 3, 1972

[54] DRIVE MODE SELECTION SYSTEM FOR TRANSMISSIONS

[72] Inventors: Gordon D. Corrigan, Livonia; Donald H. Lee, Ann Arbor; Howard E. Olsen, Plymouth; Robert J. Petry, Berkley, all of Mich.

[73] Assignee: General Motors Corporation, Detroit, Mich.

[22] Filed: Oct. 5, 1970

[21] Appl. No.: 78,077

[52] U.S. Cl. ................................................. 74/753
[51] Int. Cl. ............................................... F16h 3/44
[58] Field of Search ...................... 74/753; 91/DIG. 1

[56] References Cited

UNITED STATES PATENTS

| | | | |
|---|---|---|---|
| 3,072,146 | 1/1963 | Gizeski | 91/DIG. 1 |
| 3,468,194 | 9/1969 | Horsch et al. | 74/753 |

Primary Examiner—C. J. Husar
Attorney—W. E. Finken, A. M. Heiter and Charles R. White

[57] ABSTRACT

Transmission operation selector system in which a selector valve is moved to predetermined control positions by the force of line pressure acting on a differential area of the selector valve and the opposing force of a signal pressure in a control chamber at one end of the valve. Signal pressure is controlled by solenoid operated valves operatively connected to a selector switch controlled by the vehicle operator. A line feed valve which controls the supply of operating fluid to the selector valve is controlled by a solenoid operated valve and cooperating pressure switches to cut off the feed of the fluid to the selector valve to prevent vehicle motion other than that selected when any one solenoid has failed.

8 Claims, 1 Drawing Figure

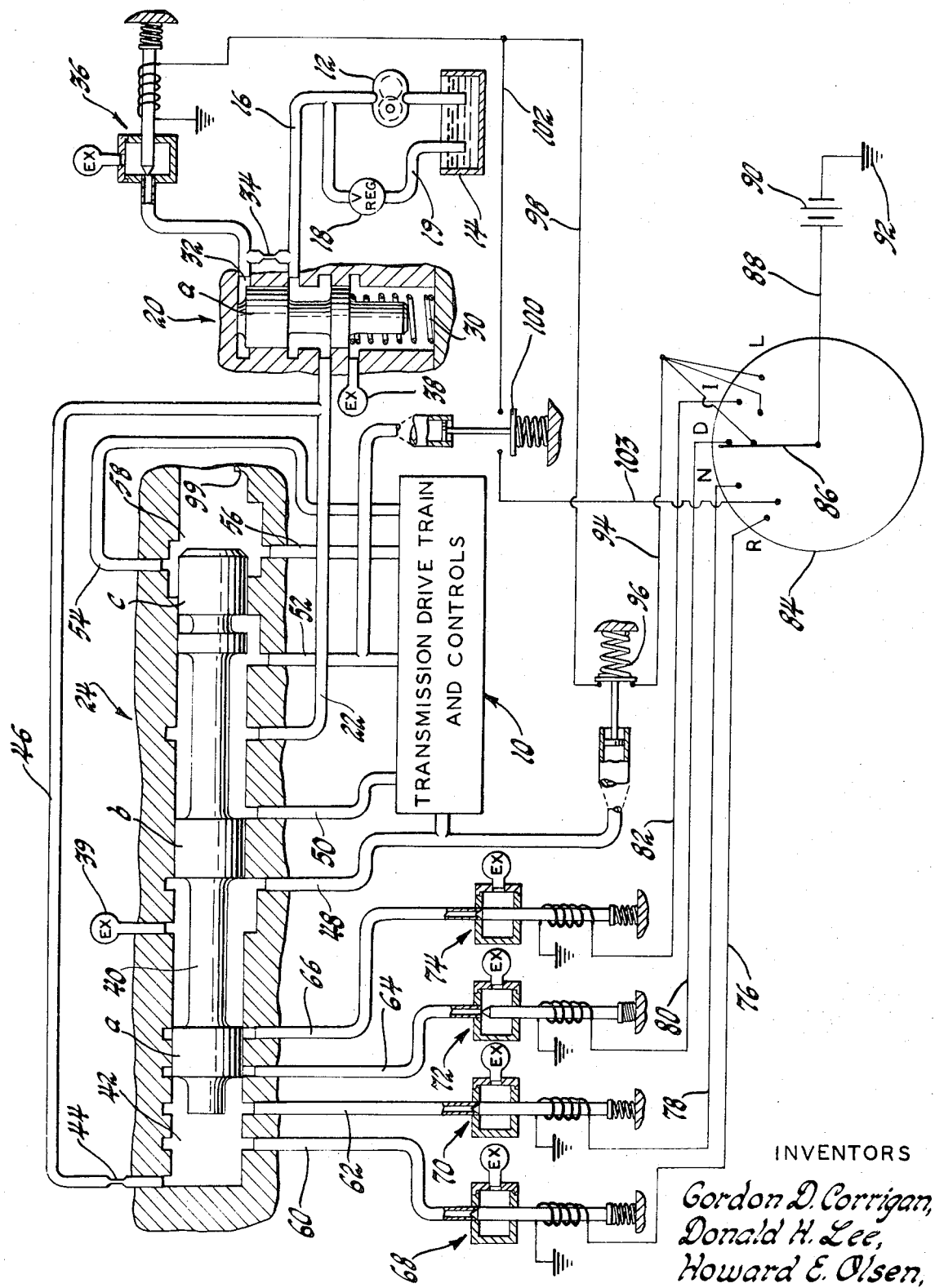

DRIVE MODE SELECTION SYSTEM FOR TRANSMISSIONS

This invention relates to automatic transmissions and controls and more particularly to a drive mode selection system for automatic transmissions in which a hydraulically controlled selector valve under the control of the vehicle operator is positioned to any predetermined transmission control position.

The selector valve control mechanisms presently being used in most modern vehicles are comprised of special mechanical linkages which drivingly connect the manual lever to the selector valve in the hydraulic controls of an automatic transmission. The selector valve is moved by positioning the manual lever to various positions to condition the automatic transmission for predetermined operation such as low, intermediate, drive, neutral and reverse. These mechanical linkages have been highly satisfactory and reliable but they often require a complex linkage system and do not provide a completely remote, flexible and compact control system.

It is a feature and object of this invention to provide a new and improved transmission control incorporating a hydraulically operated selector valve which is positioned at predetermined positions in response to signals from a vehicle operator.

Another feature and object of this invention is to provide a new and improved transmission control which eliminates the manual selector lever and the mechanical connection to the selector valve in a transmission control.

Another feature and object of this invention is to provide an electric drive mode selection system for an automatic transmission for vehicles in which a manual valve is positioned by signal pressures controlled by solenoid valves operated through a switch mechanism movable to a predetermined number of control stations by a vehicle operator.

This invention eliminates the manual lever and mechanical linkage drivingly connected to the selector valve to provide a space-saving and flexible system permitting a wide choice in the location of the manually operated transmission control. The selector valve of this invention is oriented with conventional hydraulic controls that respond to predetermined vehicle operating signals such as transmission output speed and engine torque demand to automatically condition the transmission for appropriate operations. Preferably in this invention line pressure working on a differential area between a pair of lands of the selector valve element provides a biasing force for shifting the valve element in one direction. This force is opposed by the force of line pressure working in a control chamber provided at the end of the selector valve element. The pressure in this chamber is controlled by a series of spaced ports each controlled by a solenoid operated valve connected to a central switching mechanism. Selector valve position is varied by selectively controlling the solenoid operated valves through the switching mechanisms to open and close the ports to vary the pressure in the control chamber. When a particular port is opened by energization of the associated solenoid, the pressure in the control chamber will allow the selector valve to move to a blocking position thereby closing the open port. In all driving ranges a special solenoid is energized to allow the porting of line pressure through a line feed valve to the selector valve. If the selector valve becomes stuck or there is solenoid failure when the manual valve is in driving position while the control switch is signaling reverse or while the selector valve is in reverse and the control switch is signaling forward drive, pressure switch means will be opened to deenergize the special solenoid so that the line feed valve will cut off the supply of line pressure to the selector valve to neutralize the transmission and provide for fail-safe operation.

These and other features, objects and advantages of this invention will become more apparent from the following detailed description and drawing in which:

The FIGURE is a diagrammatical illustration of a transmission, a selector valve and selector valve controls.

In the preferred embodiment of this invention a drive train and transmission control 10 is provided which is preferably of the type disclosed in U.S. Pat. No. 3,541,887 to Van Lent, et al., entitled Transmission and Control. The transmission controls 10 include a fluid pump, which is illustrated on the present drawing as pump 12, driven by the engine of the vehicle. This pump provides the fluid pressure supply for the transmission control system and only operates when the engine is operating to draw fluid from sump 14 through an inlet passage and delivers the fluid under pressure to a line feed passage 16. The pressure in the line feed passage 16 is regulated by a conventional regulator valve 18 which operates to bypass excess fluid from the line feed passage 16 back to sump 14 via an exhaust passage 19. The line feed passage 16 is connected to a line feed valve 20 which controls the flow of main line pressure through line 22 to the selector valve 24. The line feed valve has a shiftable valve element movable in a bore between fluid-blocking and fluid-flow positions. The valve is biased in one direction in the bore by a coil spring 30 to a position in which the line feed passage 16 is open to line 22. As shown, the line feed passage is connected with a control chamber 32 through a flow control orifice 34. Chamber 32 is opened and closed by a solenoid operated valve 36. When the solenoid operated valve is closed, the chamber 32 is closed and line pressure from the pump 12 will be established in chamber 32 to move the line feed valve downwardly into a blocking position in which the land $a$ of this valve blocks the flow of fluid from the line feed passage 16 into the line 22 to thereby cut off the flow of fluid to the selector valve 24 while opening line 22 and the selector valve to exhaust 38. When the solenoid of valve 36 is energized, control chamber 32 is open to exhaust so that no pressure can be established in this chamber and the spring 30 will move the valve element of the line feed valve to the position shown allowing the supply of fluid to the selector valve.

The selector valve 24 has a valve element 40 with lands $a$, $b$ and $c$ which are used to control the supply of fluid from the selector valve to the transmission control 10. Land $a$ establishes a control chamber 42 at the end of the valve element to provide for the hydraulic positioning of the valve element. As shown, the control chamber 42 is connected into line 22 by a flow control orifice 44 and a connecting passage 46 which joins into the line 22. Land $b$ controls the reverse passage 48 which leads from the valve 24 to the transmission controls and the reverse-neutral-drive line 50. Land c controls the drive line 52, the intermediate passage 54 and the low range passage 56. As shown, valve 24 has an end exhaust 58 as well as an exhaust 39. At the other end of the valve leading into chamber 42 is a reverse signal passage 60, a neutral signal passage 62, a drive signal passage 64 and an intermediate signal passage 66. These passages are linearly arranged and each is blocked from an associated exhaust by its respective solenoid operated valves 68, 70, 72 and 74.

The solenoids of these valves are connected by electric conductors 76, 78, 80 and 82 respectively to a control switch 84. The switch has a manually movable contact 86 which is operatively connected by a conductor 88 to a source of electrical energy such as battery 90 grounded at 92. The switch is marked with appropriate legends such as R, N, D, I and L to indicate transmission operation of reverse, neutral, drive, intermediate and low respectively, and is located inside of the vehicle convenient to the vehicle operator. As shown, the forward drive positions of the indicator, namely D, I and L, are connected by separate conductors to a conductor 94 that leads to a pressure switch 96 that is connected by conductor 98 to the solenoid of value 36 of the line feed valve. Also, in the reverse position of indicator 86 a conductor 103 is connected to a pressure switch 100 which is connected by a conductor 102 to the solenoid of valve 36. With either of these two pressure switches closed, the solenoid of valve 36 can be energized so that the line feed valve supplies line pressure to the manual valve. If the manual valve is in drive position while the control switch is signaling reverse or if the manual valve is in reverse position and the control switch is signaling forward drive, the pressure switch will be opened to deenergize solenoid valve 36 thereby cutting off line flow to the valve body.

The following chart illustrates the energization E and deenergization D of the solenoids to obtain predetermined transmission operations through the appropriate positioning of the contact 86 by a vehicle operator:

retract the associated valve elements off of their seats against the force of the closing spring. This action opens the drive signal passage 64 to the associated exhaust in valve 72. Under these conditions pressure in expansible chamber 42 will decrease and line pressure supplied to the selector valve will act on the differential area between lands b and c to position the valve to the illustrated position in which the port to passage 64 is closed. When the land a covers the port for passage 64, the chamber 42 will be closed allowing pressure buildup in this chamber. The balancing of opposing forces acting on the valve element resulting from the coaction of land a and the port which is open to exhaust determines the position of the valve element. In the illustrated position of the valve element line pressure enters into drive line 52 to the transmission controls which are than conditioned for automatic forward drive.

If reverse is desired, the contact 86 is moved to the reverse position so that solenoid operated valves 68 and 36 are energized while solenoid operated valves 70, 72 and 74 are deenergized. Under these conditions, the selector valve element 40 will be moved to the reverse position to condition transmission control 10 for reverse drive. The operating conditions of the solenoids for the other transmission selections are as indicated in the chart.

If one of the solenoids were to fail, the transmission would stay in the drive direction selected or become neutralized. This is illustrated in the following second chart. The letters R, N, D, I and L signify Reverse, Neutral, Drive, Intermediate and Low, respectively and the underlining indicates whether the solenoid is off or on in a particular operating range. In reverse, for example, the solenoids of valves 68 and 36 are normally on and the solenoids of valves 68, 70, 72 and 74 are normally off as indicated by the underlining of the reverse indication R. The letters not underlined illustrate transmission operation in the event that any particular solenoid changes from one condition to another such as from an energized to a deenergized condition.

| Range | Sol. 68 | | Sol. 70 | | Sol. 72 | | Sol. 74 | | Sol. 36 | | Stuck feed valve | | Stuck selector valve | | | | |
|---|---|---|---|---|---|---|---|---|---|---|---|---|---|---|---|---|---|
| | On | Off | On | Off | On | Off | On | Off | On | Off | Up | Down | N | R | D | I | L |
| Reverse | R | N | R | R | R | R | R | R | R | N | R | N | N | R | N | N | N |
| Neutral | N | N | N | N | N | N | N | N | N | N | N | N | N | N | N | N | N |
| Drive | N | D | N | D | D | L | D | D | D | N | D | N | N | N | D | I | L |
| Int | N | I | N | I | D | I | I | L | I | N | I | N | N | N | D | I | L |
| Lo | N | L | N | L | D | L | I | L | L | N | L | N | N | N | D | I | L |

SOLENOID VALVE

| | 68 | 70 | 72 | 74 | 36 |
|---|---|---|---|---|---|
| REV. | E | D | D | D | E |
| NEUT. | D | E | D | D | D |
| DR. | D | D | E | D | E |
| INT. | D | D | D | E | E |
| LO. | D | D | D | D | E |

For example, if automatic forward drive is desired, the contact 86 is manually moved to the illustrated position and the circuits to the solenoids of valves 36 and 72 are completed to energize the solenoids which From the second chart, it will be understood that, when any one element becomes worn-out, the transmission will remain in a selected drive direction or will become neutralized. For example, if the transmission is in reverse and the service life of any one solenoid terminates, the transmission will remain in reverse or become neutralized. Thus, if the selector valve element is in the reverse position to condition the transmission for reverse and the solenoid of valve 68 is deenergized, pressure in expansible chamber 42 increases exerting a force on the selector valve element 40 moving it to the extreme right hand position as established by stop 99. Under these conditions drive line 52 becomes pressurized and control switch 100 becomes opened to effect deenergization of the solenoid of valve 36 so that the spring seats the associated valve element and the control chamber 32 of the line feed valve is thereby established. Pressure in chamber 32 forces valve element 26 downwardly so that the line 22 and the selector valve are opened to exhaust 38. When this occurs, the transmission will become neutralized since there is no feed from the line feed valve into the selector valve. This neutral condition is indicated by the letter N in the first box in the chart.

If the solenoid of valve 68 is energized so that the selector valve element is moved to the reverse position and subsequently if any one of the solenoids for valves 70, 72 and 74 become energized, the selector valve element will remain in the reverse position with the chamber between lands *a* and *b* being opened to exhaust 39. This is indicated by the letter R which is not underlined as listed in each of the boxes for the solenoid valves 70, 72 and 74.

The feed valve element is normally "up" in reverse as shown by the underlined letter R. If this valve element is stuck in the "down" position, the transmission will be conditioned for neutral as indicated by the letter N.

If the selector valve becomes stuck in the driving position D while reverse R is being signaled by the control switch, the pressure switch 100 will open under influence of pressure in drive line 52 to deactivate solenoid valve 36. Pressure in chamber 32 will force the line feed valve down so that fluid from line 22 and the selector valve will be exhausted. The neutral condition of the transmission under these circumstances is indicated by the letter N under the drive indication D.

In another example, if the selector switch is set for drive D so that the solenoid for valve 72 is energized and the valve element is in drive position and solenoid of valve 68 subsequently becomes energized, the pressure in expansible chamber 42 diminishes as reverse signal passage 60 is exhausted. The selector valve element is urged to the left so that land *a* covers the port for the reverse signal line. Under these conditions reverse passage 48 is pressurized so that pressure switch 96 opens and solenoid valve 36 is deenergized. Chamber 32 becomes established and line feed valve is forced downwardly to cut off the feed of line oil into the selector valve and to open the selector valve to exhaust 38 so that the transmission becomes neutralized as indicated by the letter N in the first box of the drive range. The other operations are now readily apparent from the charts and need not be further described.

While a preferred embodiment of the invention has been shown and described, there are many other desirable embodiments now apparent to those skilled in the art. Accordingly, this invention is not to be limited to the particular embodiments but by the claims which follow.

What is claimed is:

1. In a drive mode selector system for an automatic transmission having a plurality of predetermined operations comprising low speed forward drive and automatic change speed forward drive, a hydraulically operated selector valve having a shiftable valve element, a source of fluid pressure, fluid conducting means connecting said source to said selector valve so that the pressure provided by said source provides a force urging said shiftable valve element in a predetermined direction, said selector valve having an expansible control chamber hydraulically connected to said fluid pressure source for receiving pressure fluid therefrom which urges said shiftable valve element in an opposite direction, a series of spaced exhaust ports formed in said selector valve communicating with said expansible control chamber, valve means normally closing each of said ports to permit the pressure of the fluid from said source to build up in said expansible control chamber and thereby urge said shiftable valve element to a first position to condition the transmission for a forward drive operation, and operator means for said valve means selectively opening any of said ports to decay the pressure in said expansible control chamber so that said shiftable valve element will move to a second position to close said opened port thereby conditioning the transmission for another forward drive operation.

2. The selector system defined in claim 1 wherein said first position of said shiftable valve element is established by a stop mechanism which mechanically contacts said shiftable valve element to condition the transmission for low range forward drive, said shiftable valve element having first and second lands with opposing cross-sectional areas providing a differential land area operatively connected to said source so that fluid pressure can exert a force on said shiftable valve element to move said shiftable valve element to said second position to condition the transmission for automatic change-speed forward drive when a first of said exhaust ports is opened by said operator means, said shiftable valve element having a control land which opens said expansible chamber to exhaust in response to increased pressure in said expansible chamber by uncovering said first exhaust port so that opposing forces on said shiftable valve element will maintain said shiftable valve element in said second forward drive position.

3. In a drive mode selector system for an automatic transmission control, a selector valve, a source of fluid pressure, fluid conducting means connecting said source to said selector valve, said valve having a shiftable valve element with lands having facing end areas providing an area differential so that pressure from said source fed to said valve will urge said valve element in a predetermined direction, an expansible control chamber formed by said shiftable valve element, a series of exhaust ports communicating with said expansible control chamber, valve means for closing and opening each of said exhaust ports, control means operatively connected to said valve means to effect the opening of any of said ports thereby allowing the pressure to decay in said expansible control chamber so that said shiftable valve element is moved by the force exerted by fluid pressure on said differential area of said lands to a position in which said opened port is blocked by said shiftable valve element to thereby seal said expansible control chamber so that the hydraulic forces acting on said shiftable valve element maintain said shiftable valve element in a predetermined position.

4. In a drive mode selection system for a transmission comprising a hydraulically operated transmission control, said control including a drive mode selector valve having a hydraulically actuated selector valve element, a source of operating fluid for said selector valve, a line feed valve operatively disposed between said source and said selector valve, said line feed valve having a first control chamber with an exhaust, control means for opening and closing said control chamber with respect to said exhaust, a second control chamber formed by said selector valve element, fluid conducting means hydraulically connecting said second control chamber to said line feed valve, a plurality of openings spaced longitudinally in said second control chamber, exhaust means operatively connected to each of said openings, control means for each of said spaced openings to normally block said openings, operator means for said control means to effect the selective opening and closing of each of said openings to control the pressure in said control chamber to thereby position said selector valve element in predetermined positions, first and second fluid passage means hydraulically connecting said selector valve to said transmission controls, and first switch means operatively connected to said first fluid passage means and to said line feed valve for exhausting said line feed valve only when said selector valve element is in a first predetermined position and second switch means operatively connected to said second fluid passage means and to said line feed valve for exhausting said line feed valve only when said selector valve element is in another predetermined position so that said transmission will stay in the same drive direction or become neutralized in the event that any one of said control means for said spaced openings fails.

5. The drive mode selection system for a transmission as set forth in claim 4 in which said control means for each of said spaced openings comprises valve means, a solenoid for each of said valve means, a source of electrical energy, said solenoids being operatively connected to said source of electrical energy, a control switch operatively connected to said source of electrical energy and to each of said solenoids, said switch having contact means selectively movable to predetermined positions to control the opening and closing of said openings and thereby the position of said selector valve.

6. A control for an automatic change speed transmission for vehicles comprising a source of hydraulic pressure, hydraulic controls for automatically changing the input/output speed ratio of the transmission in accordance with operating signals such as transmission output speed and vehicle engine torque demand, a line feed valve operatively connected to said source, selector valve means for directing operating fluid to said hydraulic controls to selectively condition the transmission for predetermined operations such as reverse, low forward drive and automatic change-speed forward drive, fluid passage means for hydraulically connecting said line feed valve and said selector valve, said selector valve means having a shiftable valve element and having a control chamber operatively connected to said fluid passage means, a plurality of solenoid controlled valves operatively connected to said control chamber to control the volume and pressure of fluid therein, a source of electrical energy, a selector switch operatively connected to said source of electrical energy and to said solenoid valves, said selector switch having a switch element movable to any one of a predetermined number of selected positions to selectively operate said solenoid valves to thereby control the volume and pressure in said control chamber to thereby control the position of said shiftable valve element.

7. A control for an automatic change speed transmission having a plurality of ratio-changing operations comprising a source of pressurized hydraulic fluid, hydraulic control means for automatically changing the transmission input/output speed ratio for forward drive operation, a selector valve having a valve element movable to predetermined positions for directing hydraulic fluid to said control means so that said control means selectively conditions said transmission for different predetermined operations, a fluid feed line connected to said selector valve and to said fluid pressure source to supply operating fluid to said selector valve to exert a biasing force on said valve element biasing said valve element in a first direction, a line feed valve operatively connected in said fluid feed line for controlling the feed of fluid from said source to said selector valve through said fluid feed line, said selector valve having an expansible control chamber hydraulically connected to said fluid feed line for receiving pressure fluid from said source that exerts a biasing force on said movable valve element to urge said valve element in a direction opposite to said first direction, said expansible chamber having a plurality of openings therein for exhausting pressure fluid from said chamber, a control valve element for each of said openings, manually operable switch means for selectively actuating each of said control valve elements to accordingly effect a change in pressure in said expansible control chamber and a change in position of said selector valve element whereby said transmission controls are conditioned for selected operations, and additional control means operatively connected to said selector valve and to said line feed valve for moving said line feed valve to a position to cut off the feed of pressure fluid from said source to said selector valve to thereby change the transmission from a driving condition to a neutral condition when said selector valve element is in a predetermined position.

8. A control for an automatic change speed transmission comprising a source of pressurized hydraulic fluid, hydraulic control means for automatically changing the transmission input/output speed ratio, a selector valve, a plurality of fluid conducting passages operatively connecting said selector valve and said hydraulic control means, said selector valve having a selectively movable valve element for directing hydraulic fluid to said control means through said passages to selectively condition said transmission for different predetermined operations such as reverse, low range forward drive and automatic change speed forward drive, a fluid conducting line connecting said selector valve and said source of hydraulic fluid, a line feed valve for feeding fluid from said source to said selector valve through said fluid conducting line, said selector valve having an expansible control chamber hydraulically connected to said fluid conducting line for receiving pressure fluid that exerts a biasing force on said selectively movable valve element, said expansible chamber having a plurality of ports therein for exhausting pressure fluid from said chamber, a control valve element for each of said ports and control means for selectively operating each of said control valve elements to accordingly effect a change in pressure in said expansible chamber and a change in position of said selector valve element so that said transmission controls are conditioned for selected operations, said fluid conducting passages including a reverse line charged with pressure fluid when said selector valve element is in a reverse drive position and a forward drive line charged with pressure fluid when said selector valve element is in a forward drive position, said control means comprising a solenoid for each of said control valve elements, a source of electrical energy, manually operable switch means for selectively connecting said solenoids to said source for selectively opening said ports to thereby effect a pressure change in said expansible chamber, said line feed valve having a control chamber, an exhaust for said last-mentioned control chamber, solenoid operated valve means for opening said last-mentioned control chamber to said exhaust, first pressure switch means operatively connected to said reverse line and to said solenoid to effect the establishment of pressure in said control chamber in the event that said control switch is set for forward drive and the selector valve is in reverse to effect the movement of said line feed valve to cut off supply of fluid to said selector valve to thereby neutralize said transmission, second pressure switch means operatively connected to said forward drive line and to said solenoid to effect the establishment of pressure in said control chamber in the event that said control switch is set for reverse drive and said selector valve is in forward drive to cut off the supply of fluid to said selector valve to thereby condition said transmission for neutral operation.

* * * * *